United States Patent [19]

Ohmori et al.

[11] Patent Number: 5,654,844

[45] Date of Patent: Aug. 5, 1997

[54] MAGNETIC HEAD ASSEMBLY HAVING TWO HEADS WITH THE MAGNETIC LAYER OF ONE HEAD ANGLED BETWEEN 80 TO 100 RELATIVE TO THE GAP OF THE OTHER HEAD, AND METHOD AND APPARATUS USING SAME

[75] Inventors: Hiroyuki Ohmori; Tetsuya Yamamoto, both of Kanagawa; Yasunari Sugiyama, Tokyo; Mitsuharu Shoji, Kanagawa, all of Japan

[73] Assignee: Sony Corporation, Tokyo, Japan

[21] Appl. No.: 440,490

[22] Filed: May 12, 1995

[30] Foreign Application Priority Data

May 20, 1994 [JP] Japan .................................. 6-130978

[51] Int. Cl.$^6$ ................................................ G11B 5/027
[52] U.S. Cl. ..................... 360/84; 360/64; 360/119; 360/126
[58] Field of Search ........................ 360/121, 126, 360/64, 110, 111, 77.12, 130.24, 119, 8, 31, 73.12, 77.07, 124, 122, 76, 104, 109, 125, 84

[56] References Cited

U.S. PATENT DOCUMENTS 5,331,491  7/1994  Hayakawa et al. ................... 360/110
5,365,392  11/1994  Sato et al. ............................. 360/126

FOREIGN PATENT DOCUMENTS 58-001822  1/1983  Japan .

*Primary Examiner*—W. R. Young
*Assistant Examiner*—Patrick Wamsley
*Attorney, Agent, or Firm*—Hill, Steadman & Simpson

[57] ABSTRACT

A magnetic head assembly having two heads with the magnetic layer of one angled between 80° to 100° of the gap of the other, and method and apparatus using same. The angle formed on a magnetic tape by side surfaces of a laminated magnetic film of the first magnetic head and the surfaces of a magnetic gap of the second magnetic head are between 80° and 100°.

13 Claims, 13 Drawing Sheets

MAGNETIC HEAD ASSEMBLY HAVING TWO HEADS WITH THE MAGNETIC LAYER OF ONE HEAD ANGLED BETWEEN 80 TO 100 RELATIVE TO THE GAP OF THE OTHER HEAD, AND METHOD AND APPARATUS USING SAME

BACKGROUND OF THE INVENTION

This invention relates to a magnetic recording and/or reproduction method and a magnetic head assembly and a magnetic recording and/or reproduction apparatus for practicing this method, and particularly to a magnetic recording and/or reproduction method, a magnetic head assembly and a magnetic recording and/or reproduction apparatus suitable for a video tape recorder or a magnetic disc apparatus.

In magnetic recording and reproduction apparatuses such as for example video tape recorders (VTRs), because in order to raise the recording density the distance (the guard band width) between mutually adjacent recording tracks (hereinafter simply called 'tracks') is almost zero or is made extremely small, there has been the problem that crosstalk from adjacent tracks tends to occur during recording and reproduction.

To overcome this problem, in common VTRs, crosstalk is reduced by the adoption of so-called azimuth recording wherein the inclinations of magnetic gaps of magnetic heads recording mutually adjacent tracks are made different. In recent years, to improve the picture quality of VTRs and the like, high quality television signal recording and digital recording wherein signals are digitized before being recorded have been advanced, higher magnetic recording densities have been being advanced together with this, and track widths have been being made smaller. Because of this, there is a limit to the extent to which crosstalk can be prevented by relying on azimuth recording alone.

Along with magnetic materials of high coercive force being used as high density magnetic recording and high frequency magnetic recording progress, so-called metal-in-gap heads wherein a metallic magnetic film is disposed in the magnetic gap in order to increase the recording capability of the magnetic head are starting to be used as magnetic heads used for recording and reproduction. Also, to handle the adoption of high recording and reproduction signal frequencies magnetic heads wherein the magnetic paths are constituted by metallic magnetic films only and the magnetic films are separated by insulating films of oxide or the like to reduce eddy current losses in the metallic magnetic films are starting to be used.

However, magnetic heads of a construction such that the insulating films and the magnetic gap are mutually parallel are not preferable because the insulating films form false magnetic gaps. To avoid this, magnetic heads of the kind shown in FIG. 1 wherein the surfaces of magnetic films 43 and the surfaces of insulating films 44 are substantially aligned with the magnetic head travel direction (i.e. the track direction) and magnetic heads of the kind shown in FIG. 2 wherein the surfaces of magnetic films 53 and the surfaces of insulating films 54 are inclined with respect to the track direction have been proposed. In FIG. 1 and FIG. 2, 42 and 52 are magnetic gaps, 47 and 57 are non-magnetic base bodies and 56 is glass.

Along with increases in the recording density of magnetic recording of VTRs and the like, and particularly increases in the track density, magnetic recording apparatuses have been becoming more subject to influences from adjacent tracks such as crosstalk. In this connection, studies aimed at reducing influences from adjacent tracks by methods such as increasing the azimuth angle of the magnetic heads have been being carried out.

By increasing the azimuth angle it is possible to reduce the size of signals from adjacent tracks with respect to the signal being reproduced from the present track, but unwanted signals reproduced other than through the magnetic gap are not reduced so much and when the track width is made small to increase the recording density the influence of these unwanted signals becomes relatively large. Especially in magnetic heads of the kind shown in FIG. 2 wherein the magnetic films are inclined with respect to the track direction, because the magnetic films always make contact with the adjacent tracks, influences from the adjacent tracks are greater than in the magnetic head shown in FIG. 1. However, magnetic heads of the structure shown in FIG. 1, because it is necessary to cut the non-magnetic base body and the magnetic films, which have greatly different hardnesses, in the same step, are not easy to manufacture and are unsuited to mass production.

SUMMARY OF THE INVENTION

This invention was devised in view of the problems described above, and an object of the invention is to provide a magnetic recording and/or reproduction method, a magnetic head assembly and a magnetic head recording and/or reproduction apparatus with which even when the track width is made small influences from adjacent tracks such as crosstalk are small and recording and reproduction at high densities are possible.

As a result of assiduous research aimed at achieving the above object, the present inventors have discovered that in recording and reproduction using a plurality of magnetic heads there is a close relationship between crosstalk and the angle formed by the side surfaces intersecting with the magnetic gap surfaces of the magnetic layer of one magnetic heads and the magnetic gap surfaces of another magnetic head. Consequently it is possible to reduce crosstalk by appropriately selecting this angle. This invention was devised based on this fact.

The invention provides a magnetic recording and/Or reproduction method wherein in by means of a first magnetic head and a second magnetic head each having a magnetic layer extending over adjacent recording tracks performing recording and/or reproduction on first and second recording tracks corresponding to these magnetic heads on a magnetic recording medium the angle formed on the magnetic recording medium by the side surfaces of the magnetic layer, intersecting with the magnetic gap surfaces, in the first magnetic head and the magnetic gap surfaces of the second magnetic head is above 80° and below 100°.

In the invention, first and second heads each having a magnetic film formed diagonally with respect to the recording tracks and having different azimuth angles are preferably used.

Magnetic heads each comprising a plurality of magnetic thin films laminated with magnetic insulating films therebetween are preferably used.

The invention also provides a magnetic head assembly wherein the above-mentioned first and second magnetic heads are supported by magnetic head supporting means which rotates and slides with respect to a magnetic recording medium.

The magnetic head supporting means preferably is a rotary head drum and the first and second magnetic heads are preferably disposed forming substantially the same central angles.

The invention also provides a recording and/or reproduction apparatus comprising the above-mentioned magnetic head assembly.

BRIEF DESCRIPTION OF THE DRAWINGS

FIG. 3(a) shows the magnetic film surface position of a first magnetic head and FIG. 3(b) that of a second magnetic head;

FIG. 12(a) schematically shows the recording tracks, and FIG. 12(b) shows the direction of travel of the magnetic heads;

FIG. 15(a) schematically shows recording tracks, and FIG. 15(b) shows the direction of travel of magnetic heads.

DETAILED DESCRIPTION OF THE PREFERRED EMBODIMENTS

Preferred embodiments of the invention will now be described.

Figure 10:
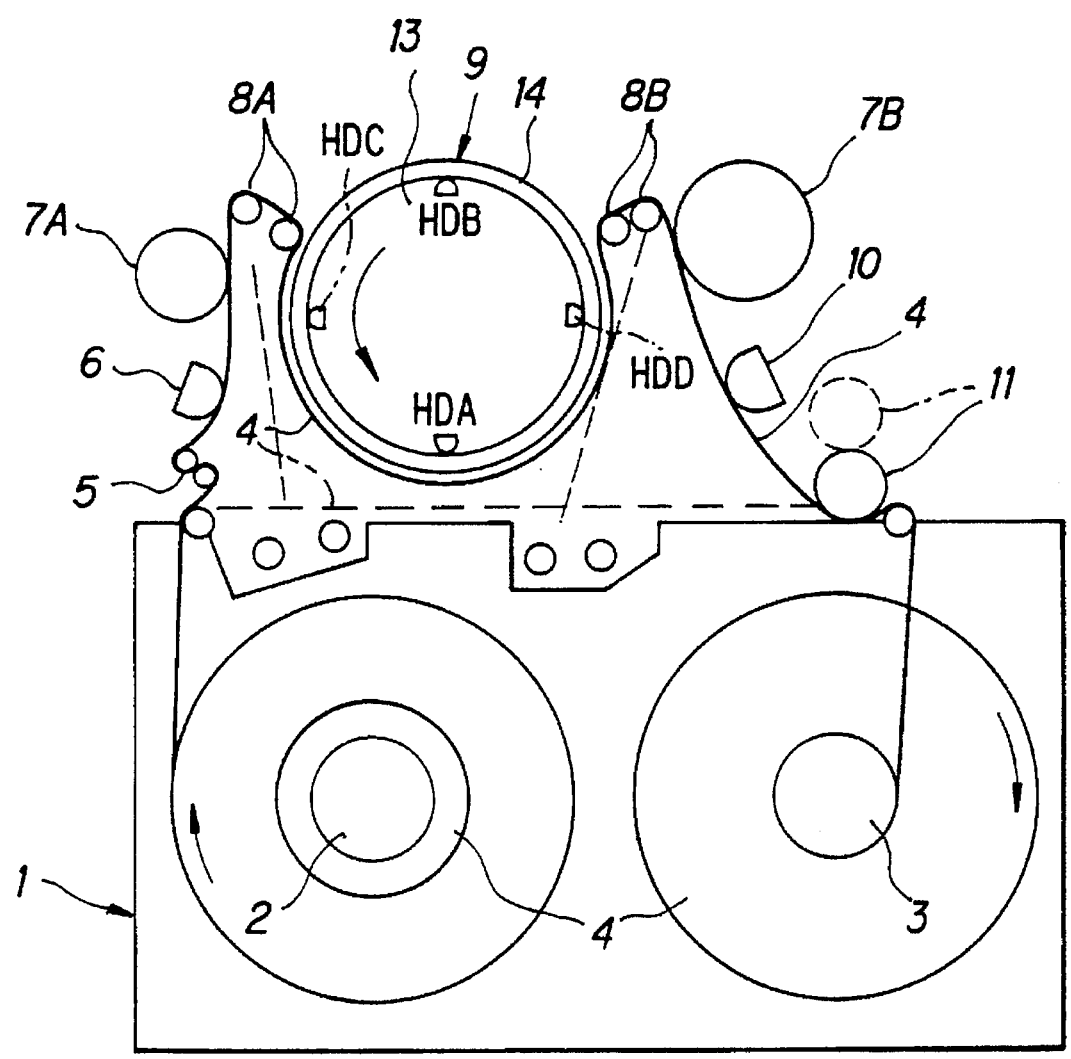
FIG. 10 is a schematic main parts plan view of a VTR fitted with the first and second magnetic heads.

FIG. 10 is a schematic main parts plan view of the vicinity of magnetic heads of a VTR and a tape cassette during recording and reproduction.

In the tape cassette 1, part of a magnetic tape 4 wound on a supply reel 2 and a takeup reel 3 lies as shown with a broken line along the rear side of a lid not shown in the drawings.

When the tape cassette 1 is loaded into the VTR, the lid opens and the part of the magnetic tape 4 shown with the broken line is pulled out by and strung around upstream side and downstream side pairs of loading guides 8A, 8B. As shown in FIG. 10, the magnetic tape 4 makes contact with a tension pole 5, an eraser head 6, an upstream side impedance roller 7A, the upstream side loading guides 8A, a rotary head drum 9, the downstream side loading guides 8B, a downstream side impedance roller 7B, an audio control head 10, a pinch roller 11 and a capstan 12, and during recording and reproduction travels as indicated by the arrows.

The rotary head drum 9 has a pair of magnetic heads HDA and HDB mounted thereon 180° apart from each other and rotates as shown by the arrow during recording and reproduction. In FIG. 10 the rotary head drum 9 is shown clear of the magnetic tape 4 to make the drawing easier to understand.

Figure 11:
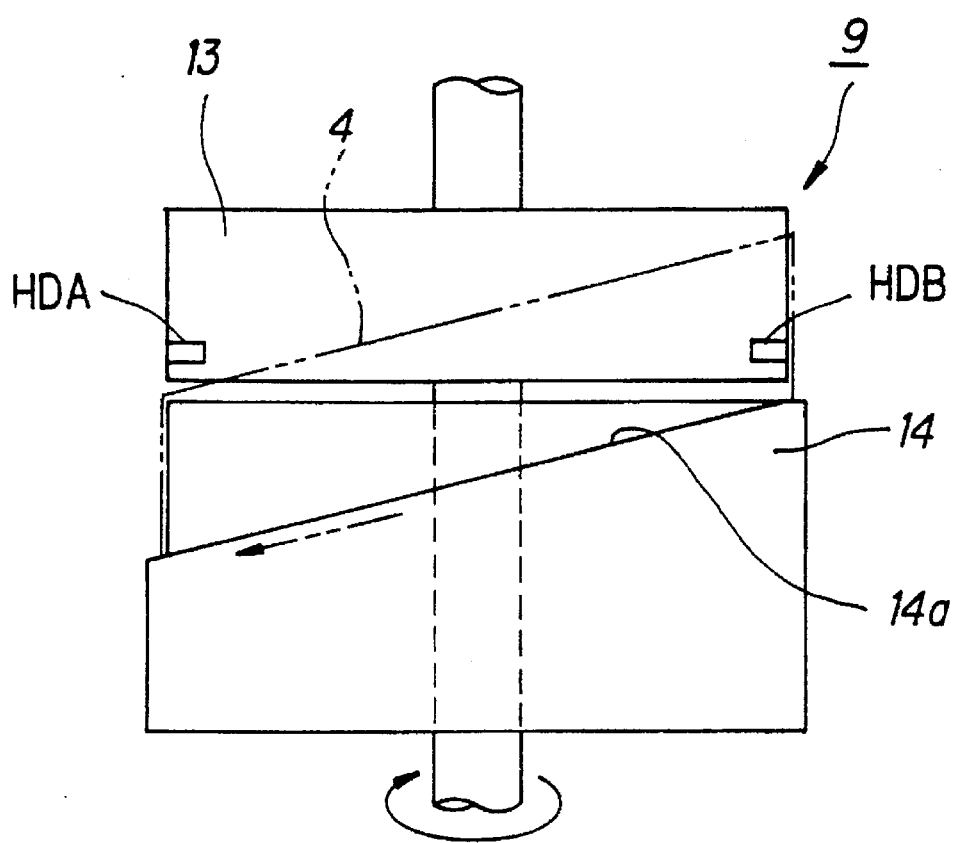
FIG. 11 is a front view of a rotary head drum of the VTR.

FIG. 11 is a front view of the rotary head drum 9. The rotary head drum 9 is called a helical scan drum and comprises an upper drum 13 connected to and rotated by a motor not shown in the drawings and a fixed lower drum 14. The magnetic heads HDA and HDB are mounted on the upper drum 13 in the positional relationship mentioned above, and the lower drum 14 is provided with a guide groove 14a of the same diameter as the upper drum 13 for guiding the magnetic tape. The magnetic tape 4, shown with broken lines, travels diagonally with respect to the rotary head drum 9 as the upper drum 13 rotates.

Figure 12A:
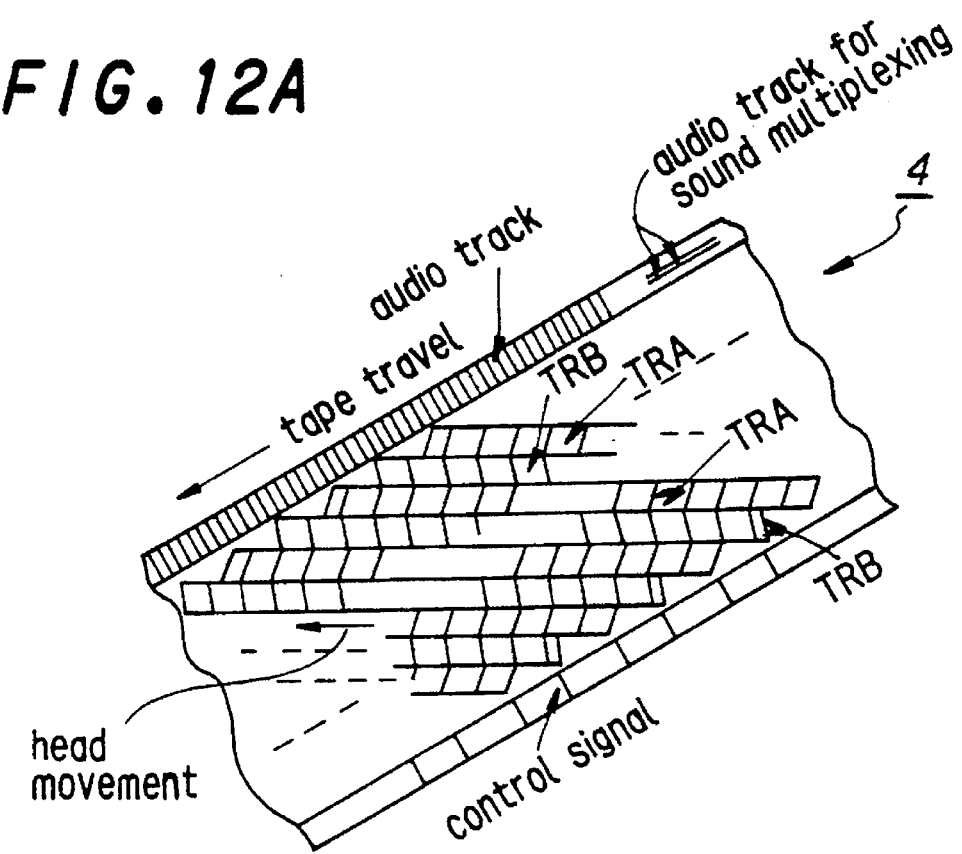
FIG. 12(a) and FIG. 12(b) are partial development views of the magnetic tape.
Figure 12B:
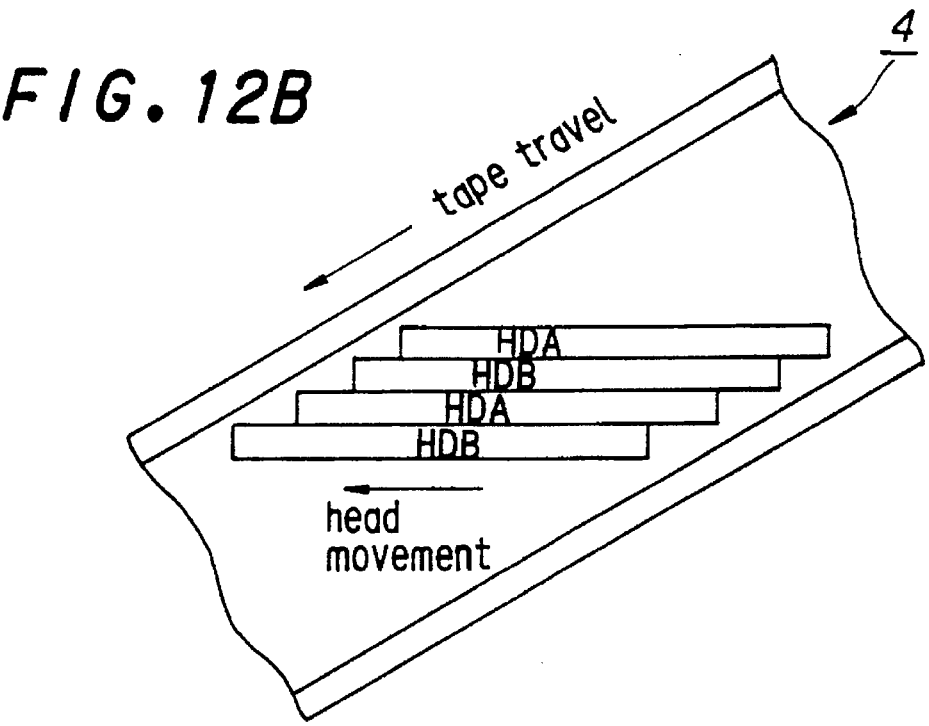

FIG. 12(a) and FIG. 12(b) are development views showing the magnetic tape schematically: FIG. 12(a) shows recorded patterns recorded by the magnetic heads HDA and HDB, and FIG. 12(b) shows the direction of travel of the magnetic heads HDA and HDB. The magnetic heads HDA and HDB are azimuth heads, and therefore the recording pattern of each track is formed in a direction inclined at the azimuth angle to the direction orthogonal to the magnetic head travel direction.

Figure 4:
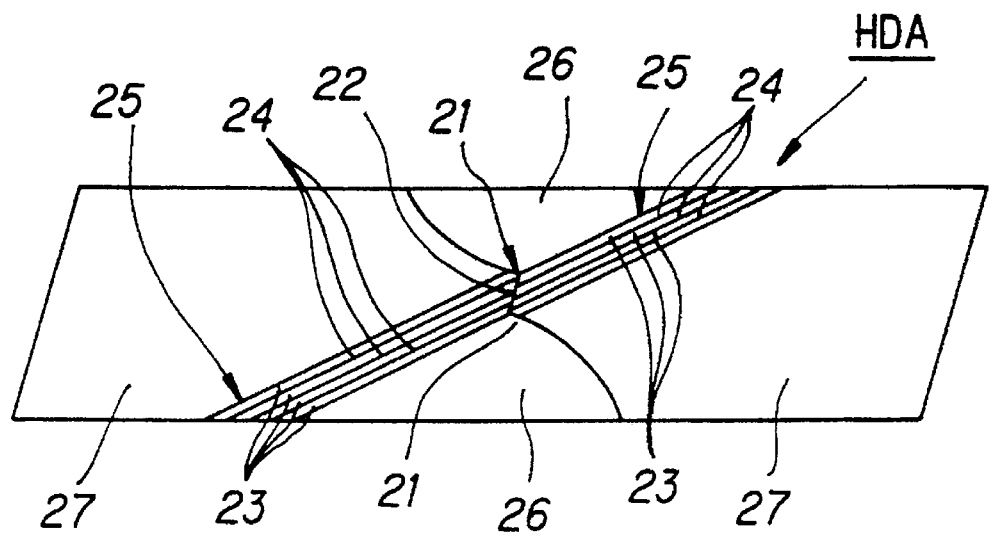
FIG. 4 is an enlarged plan view of the first magnetic head.
Figure 5:
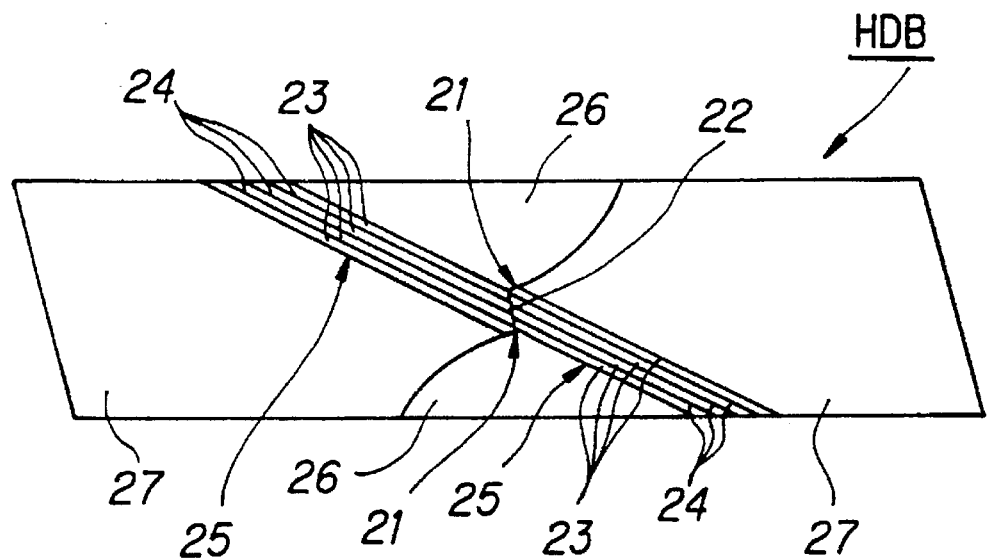
FIG. 5 is an enlarged plan view of the second magnetic head.

FIG. 4 is an enlarged plan view of the magnetic head HDA, and FIG. 5 is an enlarged plan view of the magnetic head HDB. As shown in these drawings, in magnetic heads with magnetic films formed on base body inclined surfaces, part of the magnetic film is removed at portions which become unnecessary (the cutaway portions shown by the reference number 21 by a method such as mechanical machining or ion etching to bring the magnetic film in the vicinity of the magnetic gap to a prescribed width (the track width). The pair of head pieces are then integrated by means of fusing glass. In FIG. 4 and FIG. 5, reference number 22 denotes a magnetic gap; 23 denotes magnetic films; 24 denotes insulating films; 25 denotes a laminated magnetic film; 26 denotes fusing glass; and 27 denotes a ceramic substrate.

Because the magnetic films 23 and the insulating films 24 are formed sequentially on the substrate 27 it is not necessary to cut both the substrate and the magnetic films, whose hardnesses greatly differ, in the same step, and manufacturing is therefore easy.

It is preferable from the heat processing point of view that the substrate used in the magnetic heads have approximately the same coefficient of thermal expansion as the metallic magnetic films, and sintered mixtures of $TiO_2$ and $CaO$, sintered mixtures of $NiO$ and $MnO$, sintered mixtures of $ZrO_2$ and $NiO$ and $CaO$, and $Zn$ ferrite and the like are preferably used. Also, various additives may be added to these materials in order to improve their machinability and the characteristics with which they slide over the magnetic recording medium.

Examples of the metallic magnetic film used in the magnetic heads include crystalline alloy films such as Fe-Al-Si (Sendust), Fe-Ga-Si-Ru and Ni-Fe, noncrystalline alloy films such as Co-Nb-Zr and Co-Ta-Zr, and slightly crystalline alloy films such as Fe-Al-N, Fe-Ta-N, Fe-Al-Nb-N, Fe-Ta-C, Co-Zr-Y-N and the like which have high saturation magnetic flux density and excellent soft magnetism characteristics. Various additional elements may be added to improve the soft magnetism characteristics. For the insulating films laminated with the magnetic thin films, chemically stable and well-insulating films such as $Al_2O_3$, $SiO_2$, $TiO_2$ and $Si_3N_4$ films are used.

The strongly magnetic metallic films and the insulating films mentioned above are manufactured using so-called gas phase plating techniques such as sputtering. Sputtering can be carried out using an alloy target of the desired composition ratios, or alternatively a separate target for each of the elements can be prepared and the composition controlled by adjusting their areas and the impressed output, etc. Because when the former method is employed the composition of the film is substantially exclusively determined by the composition of the target, this method is particularly preferable for example from the mass production point of view.

Methods of adding nitrogen to the film include methods such as introducing nitrogen gas or ammonia gas into the atmosphere before carrying out the sputtering.

Figure 1:
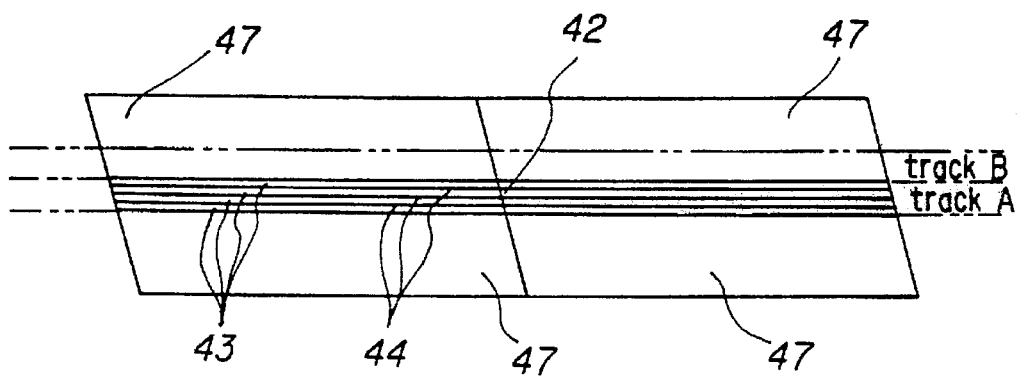
FIG. 1 is an enlarged plan view of a sliding surface of a conventional magnetic head.
Figure 2:
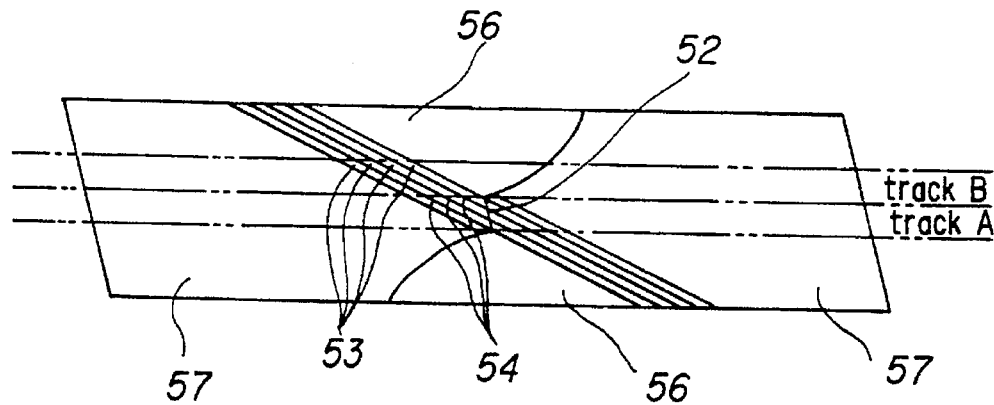
FIG. 2 is an enlarged plan view of a sliding surface of another conventional magnetic head.
Figure 3A:
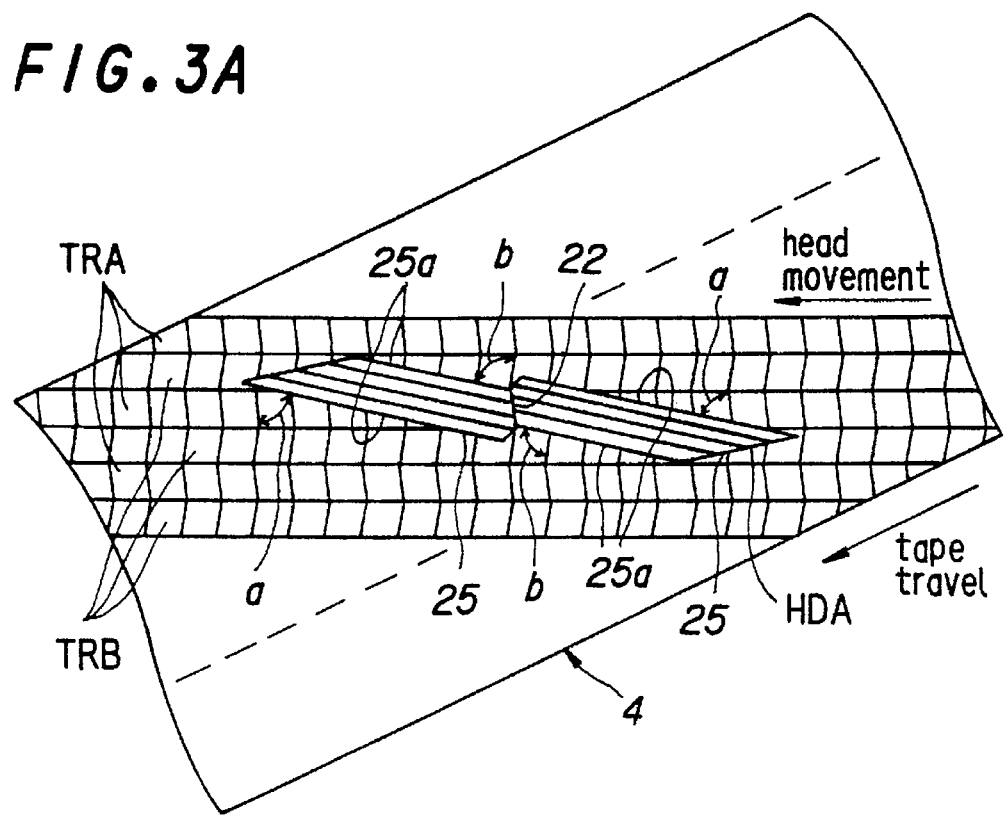
FIG. 3(a) and FIG. 3(b) are partial enlarged plan views showing the positional relationships between recording tracks on a magnetic tape and magnetic film surface of magnetic heads in a preferred embodiment of the invention.
Figure 3B:
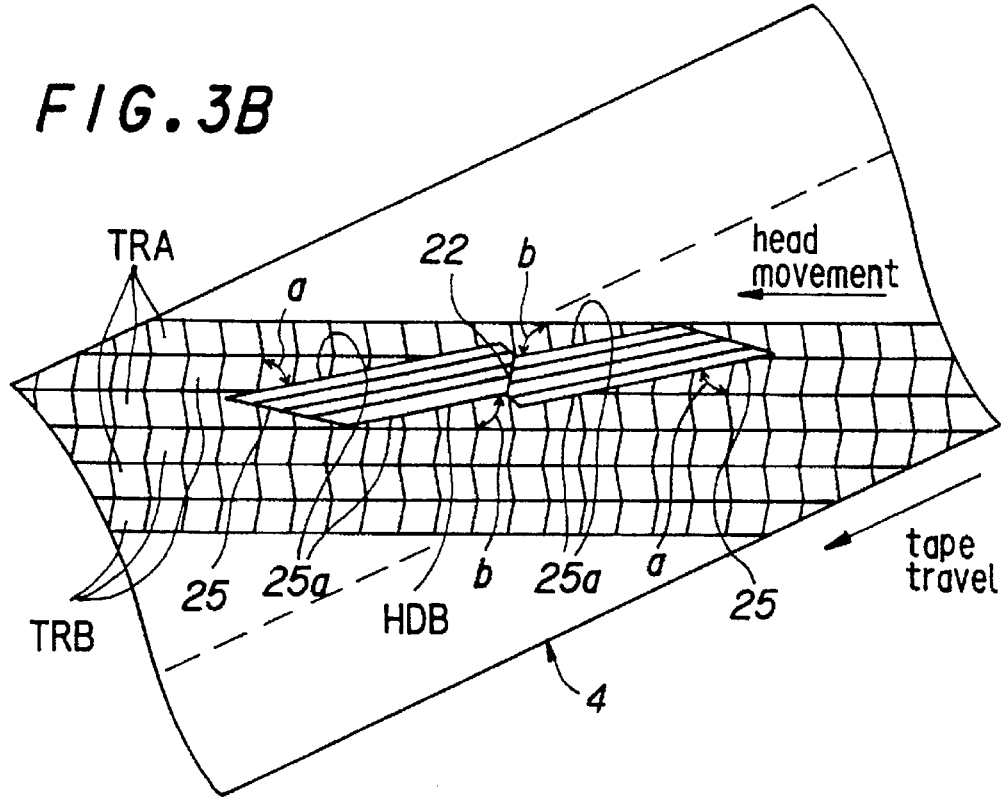
Figure 6:
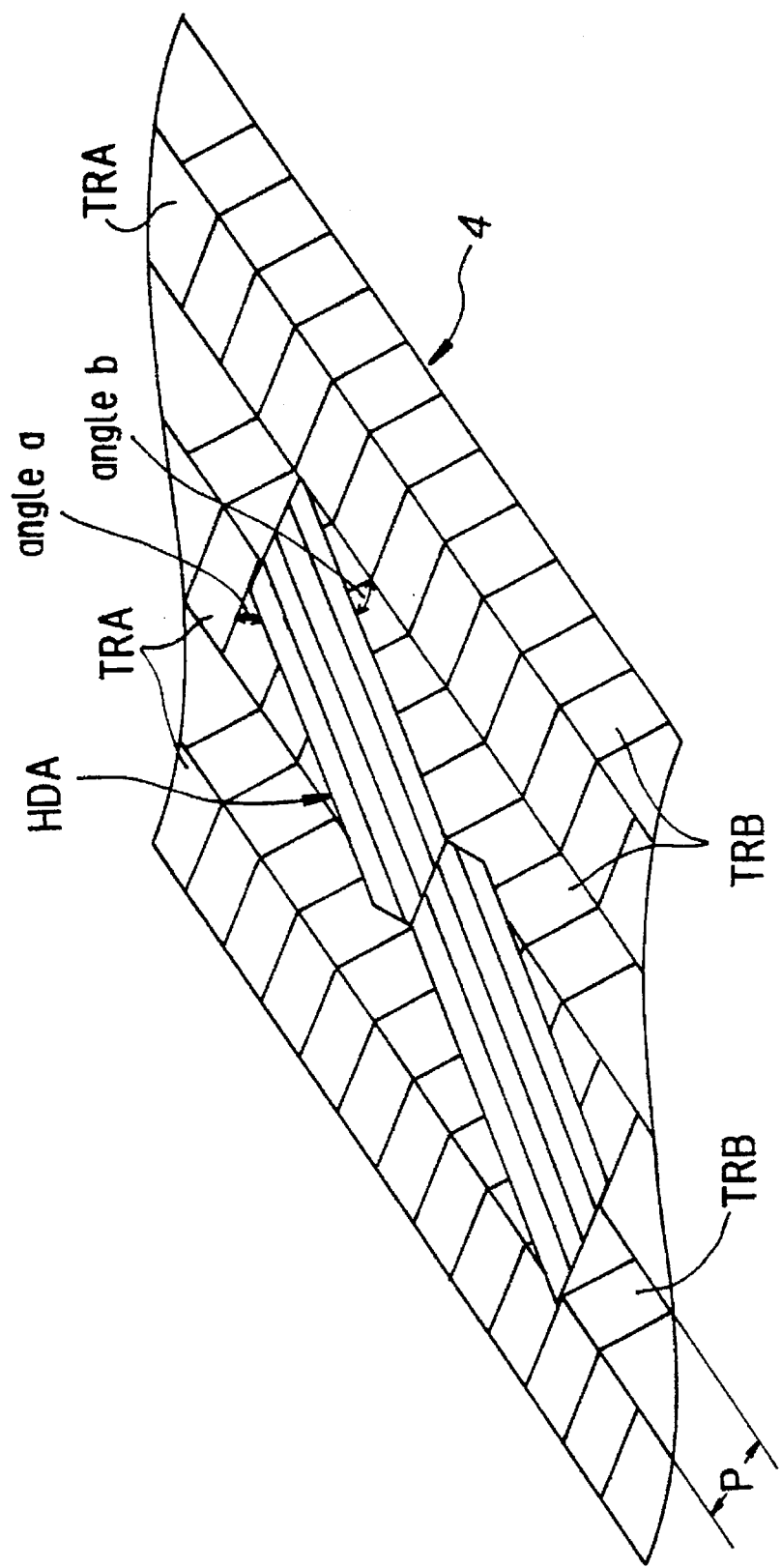
FIG. 6 is an enlarged partial perspective view showing the positional relationship between the recording tracks of the magnetic tape and the magnetic film surfaces of the first magnetic head.
Figure 7:
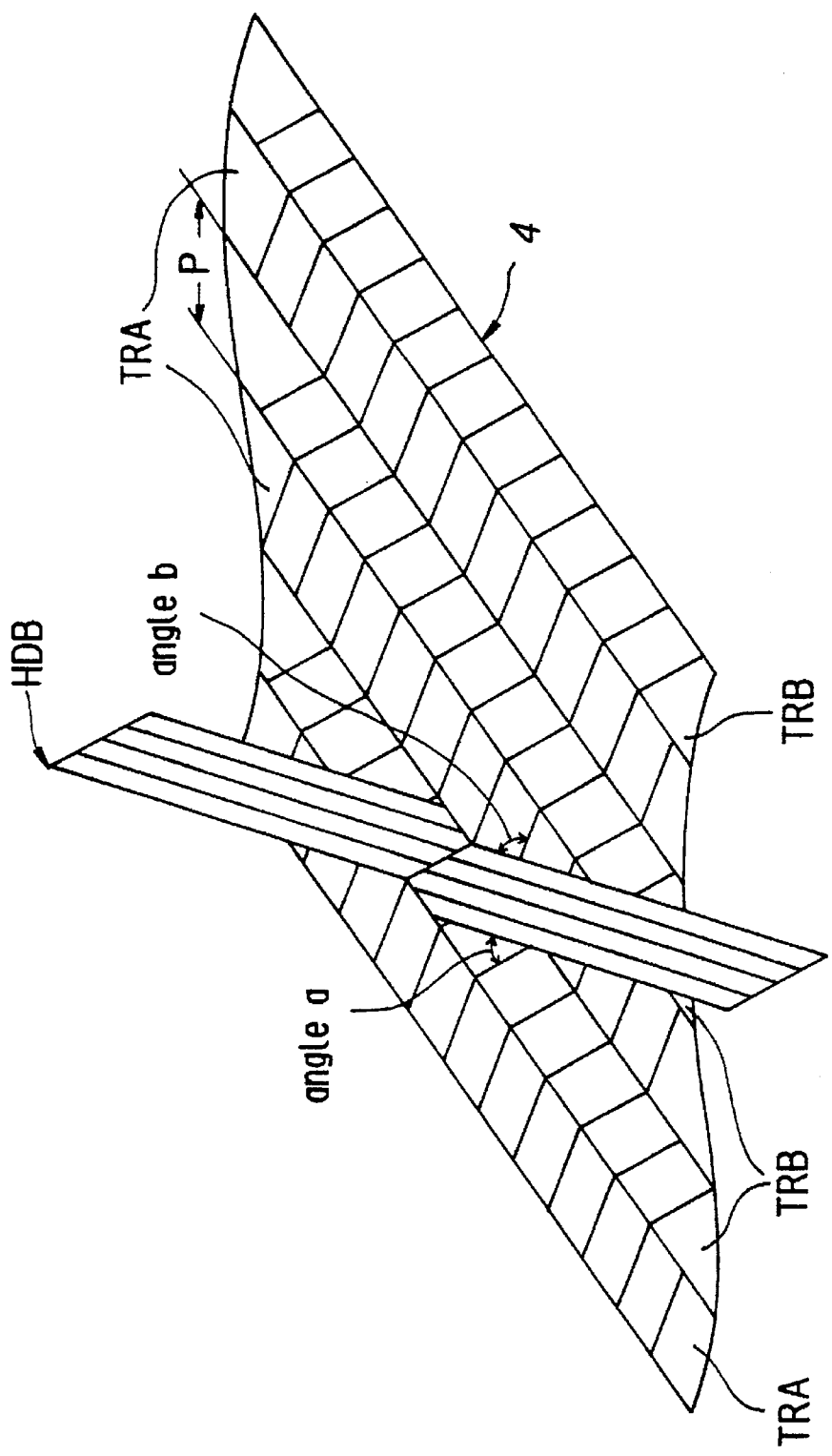
FIG. 7 is an enlarged partial perspective view showing the positional relationship between the recording tracks of the magnetic tape and the magnetic film surfaces of the second magnetic head.

A point to which attention should be paid in this preferred embodiment is that the magnetic films of the magnetic heads are disposed as shown in FIG. 3(a) and FIG. 3(b). FIG. 3(a) shows the positional relationship between the laminated magnetic film surfaces of the magnetic head HDA and the tracks of the magnetic tape, and FIG. 3(b) shows the positional relationship between the laminated magnetic film surfaces of the magnetic head HDB and the tracks of the magnetic tape. FIG. 6 and FIG. 7 are enlarged perspective views of portions of FIG. 3(a) and FIG. 3(b) respectively; in FIG. 6 and FIG. 7, P is the track pitch.

Because as mentioned above the magnetic tape 4 travels diagonally over the rotary head drum 9 in contact therewith, at the magnetic head positions the track TRA for the magnetic head HDA and the track TRB for the magnetic head HDB face the magnetic gaps 22 of the magnetic heads HDA and HDB alternately. When the laminated magnetic films 25 of the magnetic heads make contact with the magnetic tape they not only make contact with the present track but also always make contact with other, adjacent tracks.

When the angle formed by the side surfaces 25a of the laminated magnetic films 25 and the direction of the recording pattern of the respective track TRA or TRB (the direction of the magnetic gap 22) is written a and the angle formed by the side surfaces 25a of the laminated magnetic film 25 and the direction of the recording patterns of the adjacent tracks TRA or TRB (the direction of the magnetic gap 22 of the other magnetic head) is written b, the angle b is made above 80° and below 100°. As is clear from experimental results which will be discussed later, in this preferred embodiment the angle b is an extremely important parameter.

Figure 8:
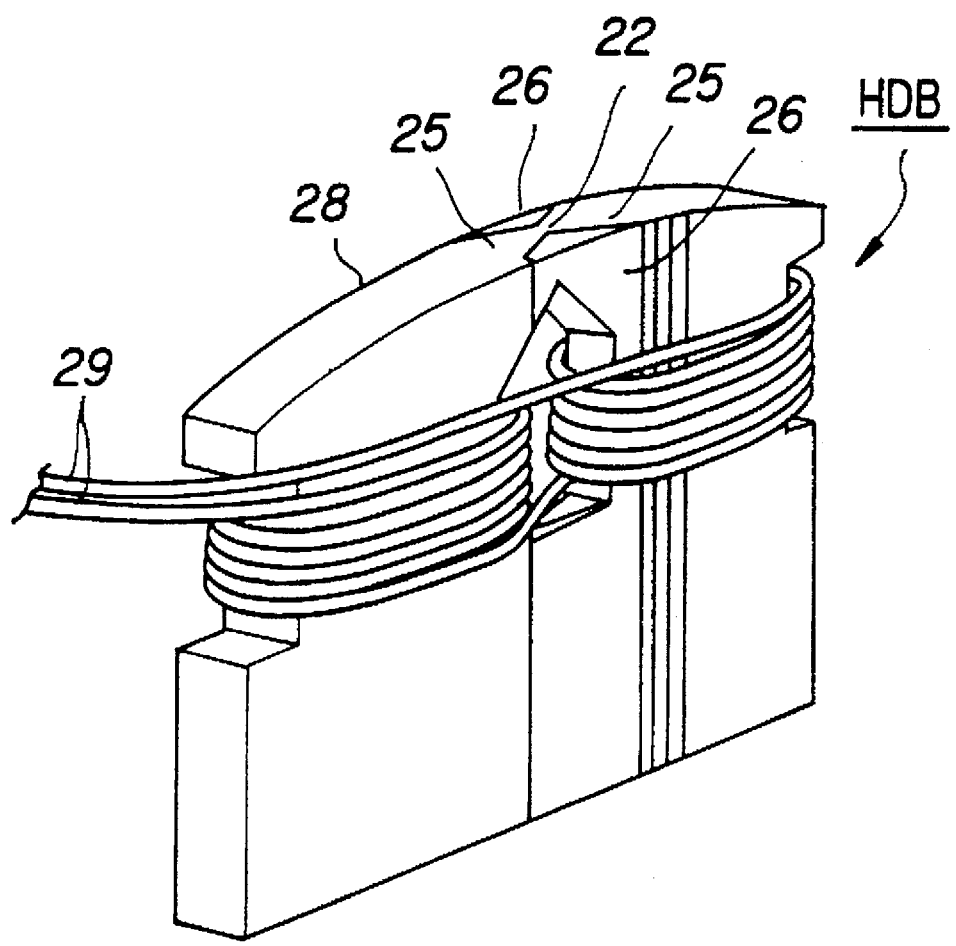
FIG. 8 is an enlarged perspective view of the second magnetic head.

FIG. 8 is an enlarged perspective view of the magnetic head HDB. The magnetic head HDB comprises a coil constituted by a wire 29 passing through a through hole 28 provided in a core; during recording a recording signal is inputted into the wire 29 as voltage variation, and recording is effected by magnetic flux leaking through the magnetic gap 22. During reproduction, information recorded on the tracks as recording patterns is picked up as voltage variation in the wire 29 and outputted as a reproduction signal. The other magnetic head HDA also has the construction shown in FIG. 8 except that the shape of the laminated magnetic film is the shape of that of the magnetic head HDB inverted.

Next, results of experiments carried out in connection with the relationship between the above-mentioned angle b and crosstalk will be discussed..

The azimuth angle of one magnetic head was fixed at 20° and a 1 MHz signal was recorded and reproduced; the azimuth angle of another magnetic head corresponding to an adjacent track was varied and the angle b thereby varied, a 1.1 MHz signal was recorded and the strength difference between the 1 MHz signal and the 1.1 MHz signal measured for each value of the angle b. The experiment was carried out for the two values of the above-mentioned angle a of 30° and 45°. Other conditions of this experiment were that the relative speed of the magnetic tape and the magnetic heads was 10 m/sec, the track width was 16 μm, and the track pitch of adjacent tracks was 20 μm. The laminated magnetic films consisted of four layers of 5 μm thick magnetic film separated by 0.2 μm thick insulating films of $Al_2O_3$.

Figure 9:
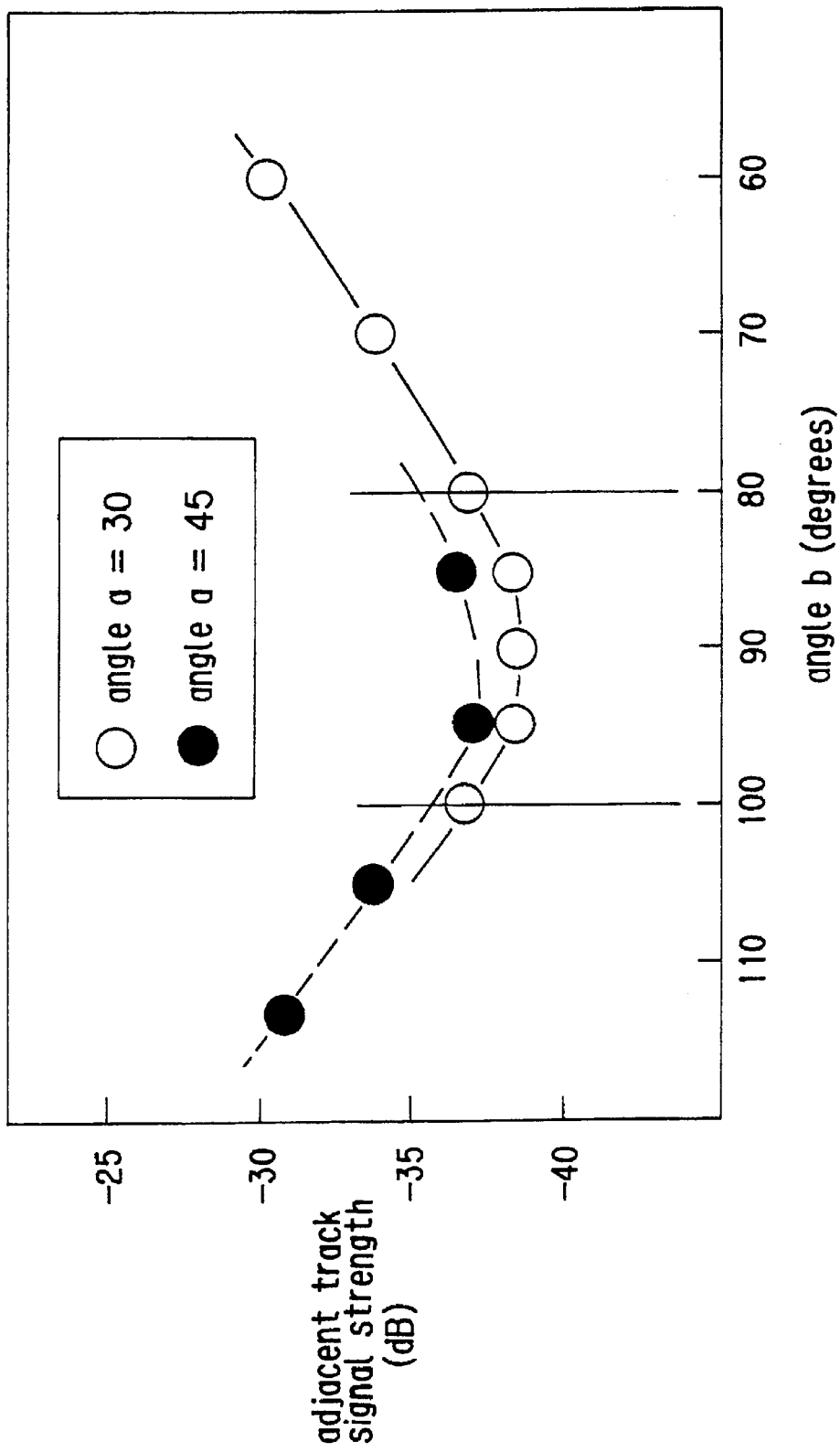
FIG. 9 is a graph showing variation in crosstalk with variation in the angle formed by the side surfaces intersecting with the magnetic gap surfaces of the magnetic layer in the first magnetic head and the magnetic gap surfaces of the second magnetic head.

The results of the measurements were that the relationship between the angle b and the strength of the signal from adjacent tracks (the amount of crosstalk) is as shown in FIG. 9. From FIG. 9 the following can be understood:

Even when the track width is made a low 16 μm, when the angle b is above 80° and below 100° there is little crosstalk and good recording and reproduction are effected. Within this range of the angle b, not only is the absolute value of the crosstalk low but also because the gradient of the curve is low the dependency of crosstalk on the angle b is low and the good recording and reproduction resulting from the reduction in crosstalk is stable and guaranteed.

The above results show that by setting the angle b as mentioned above it is possible to effect good recording and reproduction even when the track width is made small to increase the recording density. That is, the conflicting demands of recording density increase and crosstalk reduction are both fulfilled by the angle b being made above 80° and below 100°. A more preferable range of the angle b is 90°±5°, and an especially preferable angle b is 90° or about 90°.

Figure 13:
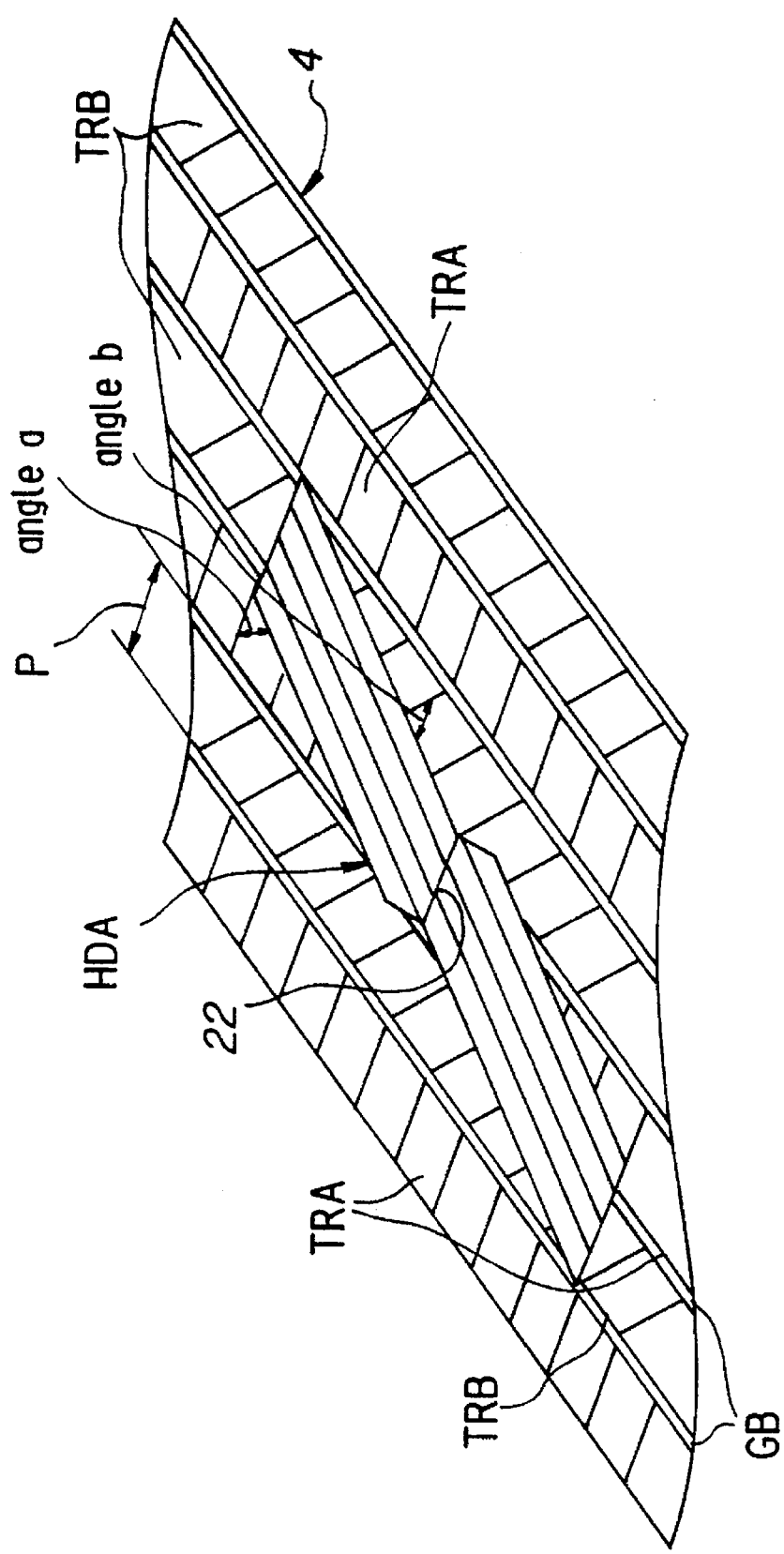
FIG. 13 is an enlarged partial perspective view similar to FIG. 6 showing the positional relationship between recording tracks of a magnetic tape and laminated magnetic film surfaces of a first magnetic head in another preferred embodiment.

In the above preferred embodiment the magnetic tape was a guardbandless one wherein the tracks are directly adjacent to each other; however, it is also possible to provide guard bands between the tracks. FIG. 13 is an enlarged partial perspective view similar to FIG. 6 showing the positional relationship between a magnetic tape and the laminated magnetic film surfaces of a magnetic head in a preferred embodiment wherein the magnetic tape is provided with guard bands. In FIG. 13, GB denotes the guard bands and P is the track pitch. Needless to say, in this preferred embodiment also it is preferable that the above-mentioned angle b be made above 80° and below 100°.

Figure 14:
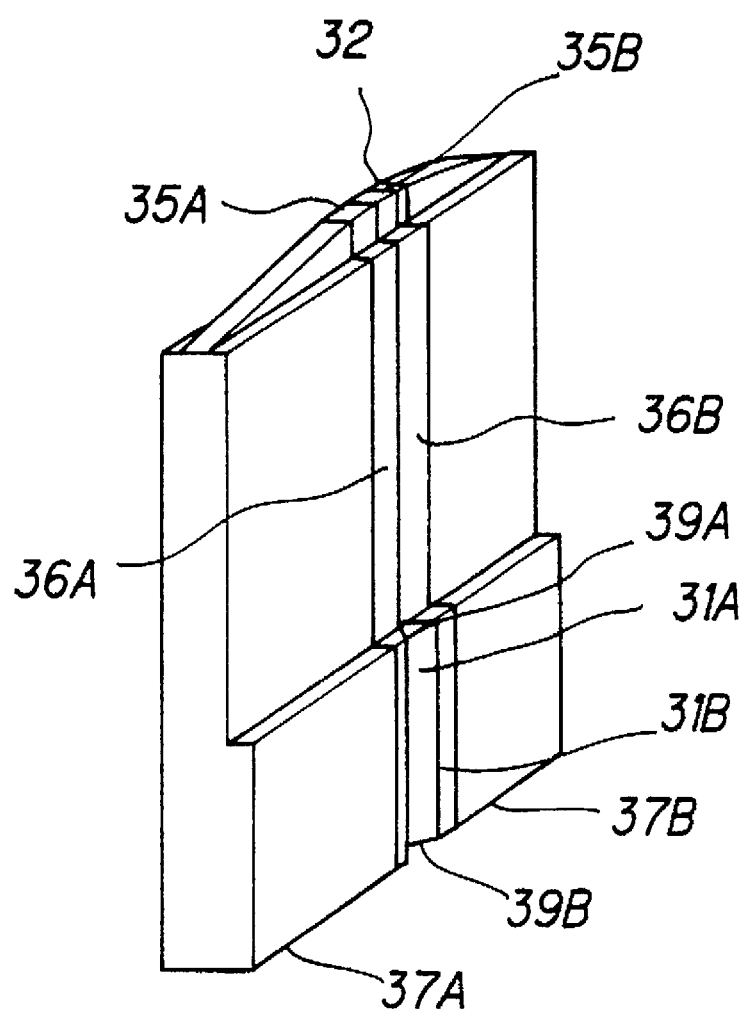
FIG. 14 is an enlarged perspective view of a magnetic head of another preferred embodiment.

Instead of consisting of the wire 29 as shown in FIG. 8, the coil of the magnetic head can be constructed by forming spiral-shaped coil patterns by thin film forming methods on each of a pair of non-magnetic insulating substrates and affixing these substrates together and connecting the central ends of the pair of coil patterns together. The laminated magnetic thin films are so formed on inclined surfaces of grooves provided in the substrates before the coil patterns are formed that they pass through the subsequently formed coil patterns. FIG. 14 is an enlarged perspective view of a magnetic head wherein the coil is such a thin film coil.

In FIG. 14, 31A and 31B are terminals of the thin film coil, 32 is a magnetic gap, 35A and 35B are laminated magnetic thin films, 36A and 36B are glass, 37A and 37B are ceramic substrates, and 39A and 39B are cutaway portions for exposing the terminal portions of the coil. The thin film coil is buried inside the magnetic head and is not visible from the outside. Because the coil consists of thin films, this type of magnetic head has the merits that compared with one in which the coil consists of a wire manufacturing is easy and the magnetic head can be made small.

In each of the preferred embodiments described above, one pair of two magnetic heads is used; however, two pairs of magnetic heads, four in total, can alternatively be used. In this case, as shown in FIG. 10, magnetic heads HDC and HDD (shown with broken lines) are so disposed between the magnetic heads HDA and HDB in the peripheral surface of the rotary head drum 9 that all the magnetic heads are equally angularly spaced around the rotary head drum 9.

Figure 15A:
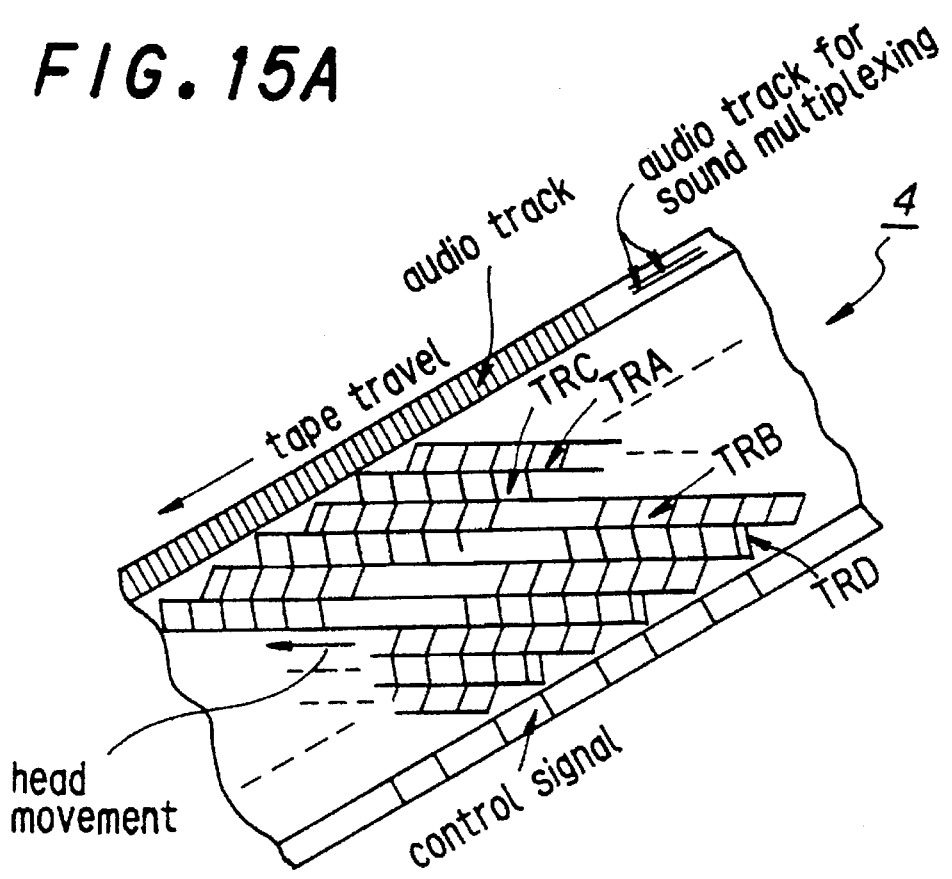
FIG. 15(a) and FIG. 15(b) are partial development views of a magnetic type of further preferred embodiment.
Figure 15B:
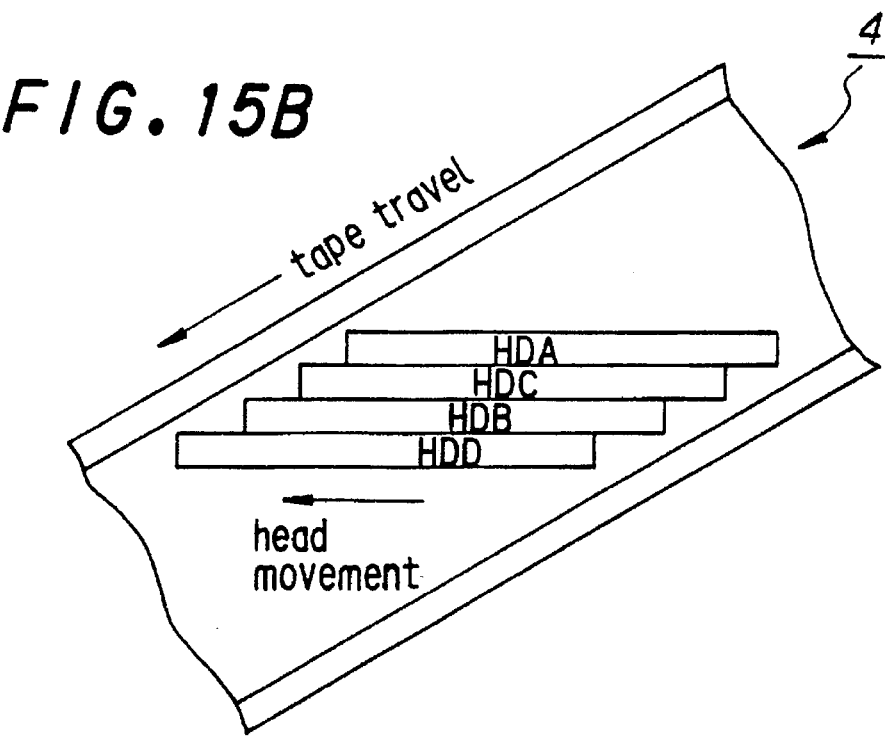

FIG. 15(a) and FIG. 15(b) are development views similar to FIG. 12(a) and FIG. 12(b) showing schematically the magnetic tape in this preferred embodiment provided with four magnetic heads: FIG. 15(a) shows recording patterns recorded by the magnetic heads HDA, HDC, HDB and HDD, and FIG. 15(b) shows the direction of travel of the magnetic heads HDA, HDC, HDB and HDD. In these figures, TRA, TRC, TRB and TRD are tracks corresponding to the magnetic heads HDA, HDC, HDB and HDD. In this preferred embodiment also, the positional relationships of the mutually adjacent magnetic heads (HDA and HDC, HDC and HDB, HDB and HDD) are made such that the above-mentioned angle b is above 80° and below 100°.

Specific preferred embodiments of the invention are described above, but various modifications can be made to the above preferred embodiments based on the technological concept of the invention.

For example, the invention can also be applied to various other forms of magnetic information recording and reproduction as well as to VTRs. According to the application the number of magnetic heads may be made other than two or four, and an odd number of magnetic heads can be used.

It is also possible to use non-azimuth magnetic heads. Furthermore, the magnetic layers of the magnetic heads can be made by cutting or sintering instead of by laminating magnetic thin films.

Also, as the magnetic recording medium, a floppy disc or the like can be used instead of magnetic tape.

As a magnetic head used for reproduction only, a multi-head such as a double azimuth head can be used.

Because in this invention the angle (the above-mentioned angle b) formed on a magnetic recording medium by the side surfaces intersecting with magnetic gap surfaces of a magnetic layer in a first magnetic head and magnetic gap surfaces of a second magnetic head is made above 80° and below 100°, the following effects are obtained:

By the above-mentioned angle being made above 80° and below 100°, the strength of signals from adjacent tracks (unwanted signals) during recording and/or reproduction decreases and the variations therein also become smaller. As a result, by making the above-mentioned angle above 80° and less than 100°, the above-mentioned signal strength can be decreased and variations in this signal strength made smaller and good recording and/or reproduction made possible.

As a result, the above-mentioned unwanted signals can be made weak (crosstalk can be reduced) even when the width of the recording tracks is made small to increase the recording density, and it becomes possible to achieve both of the conflicting objectives of increased recording density and good recording and reproduction.

What is claimed is:

1. A magnetic head assembly for recording and reproducing magnetic signals in a recording medium comprising first and second magnetic heads which travel in relation to said recording medium along respective parallel first and second tracks on said recording medium, each magnetic head comprising a magnetic layer having a side surface which extends in a plane generally aligned diagonally with respect to the tracks, each head also comprising a magnetic gap formed in its magnetic layer and oriented in transverse relation to its magnetic layer, each magnetic gap provided by parallel gap forming surfaces, the magnetic layer of the first magnetic head extending across the track of the second magnetic head as the first magnetic head travels along the medium, and an angle defined by a side surface of the magnetic layer of the first head and the gap forming surfaces of the second head being between 80° to 100°.

2. The magnetic head assembly of claim 1 wherein the first and second magnetic heads are supported so as to rotate and slide with respect to the magnetic recording medium.

3. The magnetic head assembly of claim 1 wherein each of the first and second magnetic heads has a magnetic film formed diagonally with respect to the recording tracks and wherein the first and second magnetic heads have different azimuth angles.

4. The magnetic head assembly of claim 1 wherein the magnetic layer comprises a plurality of magnetic thin films laminated with magnetic insulating films therebetween.

5. A magnetic head assembly for recording/reproducing magnetic signals in a recording medium, comprising first and second magnetic heads wherein:

said first and second heads travel along said medium along respective parallel tracks;

each of said first and second magnetic heads comprises a magnetic layer extending in a plane generally diagonally with respect to the tracks and defined by at least one outer side surface, the magnetic layer of the first magnetic head extending over a track of said second head when said first head travels along the medium;

each of the first and second heads has a magnetic gap formed in its magnetic layer, each gap formed by parallel gap forming surfaces in its respective magnetic layer, and an angle defined between the outer side surface of the magnetic layer of the first head as the first head travels along said medium and the parallel gap forming surfaces of the second head as the second head travels along the medium being between 80° and 100°.

6. The magnetic head assembly of claim 5 wherein each of the first and second magnetic heads has a magnetic film formed diagonally with respect to the recording tracks and wherein the first and second magnetic heads have different azimuth angles.

7. The magnetic head assembly of claim 5 wherein the magnetic layer comprises a plurality of magnetic thin films laminated with a magnetic insulating films therebetween.

8. A method for recording and/or reproducing magnetic signals in a magnetic recording medium, comprising the steps of:

providing relative movement between a pair of magnetic heads and said recording medium, each head traversing along said medium along a respective track, each head having a magnetic layer in which a magnetic gap is provided, each head traversing the medium such that its magnetic layer extends into a track of the other head, an angle defined in a magnetic medium by the side surface of a magnetic layer of the first head and the gap forming surfaces of the second head being between 80° and 100°.

9. The method of claim 8 wherein each of the first and second magnetic heads has a magnetic film formed diagonally with respect to the recording tracks and wherein the first and second magnetic heads have different azimuth angles.

10. The method of claim 8 wherein the magnetic layer comprises a plurality of magnetic thin films laminated with magnetic insulating films therebetween.

11. An apparatus having a magnetic head assembly for recording reproducing magnetic signals in a recording medium, said assembly comprising:

first and second magnetic heads wherein said first and second heads travel along said medium along respective parallel tracks, each of said first and second magnetic heads comprises a magnetic layer which extends in a plane aligned diagonal with respect to the tracks, the magnetic layer of the first magnetic head extending over a track of said second head when said first head travels along the medium, each of the first and second heads has a magnetic gap formed in its magnetic layer, each gap formed by parallel gap forming surfaces in its respective magnetic layer, and an angle defined between an outer side surface of the magnetic layer of the first head as the first head travels along said medium and the parallel gap forming surfaces of the second head as the second head travels along the medium being between 80° and 100°.

12. The apparatus of claim 11 wherein each of the first and second magnetic heads has a magnetic film formed diagonally with respect to the recording tracks and wherein the first and second magnetic heads have different azimuth angles.

13. The apparatus of claim 11 wherein the magnetic layer comprises a plurality of magnetic thin films laminated with magnetic insulating films therebetween.

* * * * *